(12) United States Patent
Mitsugi et al.

(10) Patent No.: US 11,346,652 B2
(45) Date of Patent: May 31, 2022

(54) BELT-LIKE GLASS FILM QUALITY INSPECTION METHOD AND GLASS ROLL

(71) Applicant: Nippon Electric Glass Co., Ltd., Shiga (JP)

(72) Inventors: Kaoru Mitsugi, Shiga (JP); Kazunari Noguchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 277 days.

(21) Appl. No.: 16/347,220

(22) PCT Filed: Nov. 30, 2017

(86) PCT No.: PCT/JP2017/043070
§ 371 (c)(1),
(2) Date: May 3, 2019

(87) PCT Pub. No.: WO2018/105489
PCT Pub. Date: Jun. 14, 2018

(65) Prior Publication Data
US 2019/0277623 A1 Sep. 12, 2019

(30) Foreign Application Priority Data
Dec. 6, 2016 (JP) .............................. JP2016-236730

(51) Int. Cl.
*G01B 11/04* (2006.01)
*G01N 21/892* (2006.01)
(Continued)

(52) U.S. Cl.
CPC ............. *G01B 11/04* (2013.01); *G01B 11/24* (2013.01); *G01N 21/8901* (2013.01); *G01N 21/892* (2013.01)

(58) Field of Classification Search
CPC ....... G01B 11/04; G01B 11/24; G01B 11/028; G01N 21/8901; G01N 21/892;
(Continued)

(56) References Cited

U.S. PATENT DOCUMENTS 6,423,930 B1 * 7/2002 Matsumoto ........... C03B 33/091
219/121.69
6,502,423 B1 * 1/2003 Ostendarp ............... C03B 17/06
65/29.14

(Continued)

FOREIGN PATENT DOCUMENTS

| JP | 2007-205724 | 8/2007 |
| JP | 2008-544253 | 12/2008 |

(Continued)

OTHER PUBLICATIONS

International Preliminary Report on Patentability dated Jun. 11, 2019 in International (PCT) Application No. PCT/JP2017/043070.
(Continued)

*Primary Examiner* — Sang H Nguyen
(74) *Attorney, Agent, or Firm* — Wenderoth, Lind & Ponack, L.L.P.

(57) ABSTRACT

In cutting a band-shaped glass film along a longitudinal direction thereof and evaluating linearity of an end side formed in association with the cutting to inspect quality of a cut band-shaped glass film, the following steps are performed: an imaging step of dividing the end side into a plurality of segments and imaging each of the plurality of segments; a linear approximation step of calculating an approximate straight line of the end side based on a plurality of points different from each other on the end side in each of a plurality of images obtained in the imaging step; a variation calculation step of calculating a variation value of the plurality of points based on the approximate straight line; and an evaluation step of evaluating the linearity of the end
(Continued)

side based on a plurality of variation values respectively corresponding to the plurality of images.

8 Claims, 3 Drawing Sheets

(51) Int. Cl.
*G01N 21/89* (2006.01)
*G01B 11/24* (2006.01)

(58) Field of Classification Search
CPC ...... G01N 21/896; B32B 37/20; B65H 18/00; B65H 39/16; B65H 39/00; C03C 17/001; C03C 17/002
USPC .......... 382/141; 356/401; 359/893; 156/249, 156/494, 499
See application file for complete search history.

(56) References Cited

U.S. PATENT DOCUMENTS

| | | | |
|---|---|---|---|
| 7,110,910 B1 | 9/2006 | Deffenbaugh et al. | |
| 8,769,989 B2* | 7/2014 | Mitsugi | C03B 21/02 65/97 |
| 9,643,878 B2* | 5/2017 | Fujii | C03B 35/167 |
| 2012/0024928 A1* | 2/2012 | Matsumoto | C03B 35/189 225/2 |
| 2013/0280495 A1* | 10/2013 | Matsumoto | C03B 33/091 428/172 |
| 2015/0346109 A1* | 12/2015 | Fontaine | G01N 21/8914 356/239.8 |
| 2016/0168003 A1* | 6/2016 | Hasegawa | C03B 33/091 65/105 |
| 2016/0238372 A1* | 8/2016 | Imanishi | G01D 5/34 |
| 2017/0369356 A1* | 12/2017 | Booth | C03B 33/033 |
| 2018/0036838 A1* | 2/2018 | Hamamura | C22C 38/00 |
| 2018/0362398 A1* | 12/2018 | DeMartino | A61J 1/062 |
| 2019/0047895 A1* | 2/2019 | Kuhn | C03B 33/0235 |

FOREIGN PATENT DOCUMENTS

| | | |
|---|---|---|
| JP | 2012-236675 | 12/2012 |
| JP | 2015-063450 | 4/2015 |
| WO | 2006/138220 | 12/2006 |
| WO | 2014/054528 | 4/2014 |

OTHER PUBLICATIONS

International Search Report dated Feb. 27, 2018 in International (PCT) Application No. PCT/JP2017/043070.
Notice of Reasons for Refusal dated Mar. 23, 2022 in corresponding Japanese Patent Application No. 2018-554963 with English translation.

* cited by examiner

BELT-LIKE GLASS FILM QUALITY INSPECTION METHOD AND GLASS ROLL

TECHNICAL FIELD

The present invention relates to a method of inspecting quality of a cut band-shaped glass film by cutting a band-shaped glass film along a longitudinal direction thereof and evaluating linearity of an end side formed in association with the cutting, and relates to a glass roll.

BACKGROUND ART

In recent years, a small thickness and a small weight are demanded for mobile terminals such as smartphones and tablet PCs which are rapidly spread. Thus, in the current condition, there is an increasing demand for reduction in thickness of glass substrates to be incorporated into those terminals. Under such current condition, a glass film which is a glass substrate reduced in thickness as small as that of a film (for example, thickness equal to or smaller than 300 µm) is now developed and manufactured.

A glass film can be manufactured, for example, by being cut out from a band-shaped glass film formed by a down-draw method. The band-shaped glass film serving as an origin of the glass film has flexibility, and the band-shaped glass film can be subjected to processing through use of the flexibility. As one example, in Patent Literature 1, there is disclosed processing of, through use of a so-called roll-to-roll mode, cutting a band-shaped glass film along a longitudinal direction thereof, and removing a non-effective portion (unnecessary portion in Patent Literature 1) from the band-shaped glass film (see FIG. 15 of Patent Literature 1).

The linearity of the end side formed in association with the cutting significantly influences the success and failure of the quality of the cut band-shaped glass film. More specifically, when the end side is meandering and has low linearity, a large stress is liable to be generated in the end side accordingly, and there is a high risk in that a breakage may occur from the end side in a step on a downstream side. Therefore, in order to inspect the quality of the cut band-shaped glass film, it is required to evaluate the linearity of the end side. As a procedure for evaluating the linearity, there are given, for example, (A) a procedure for evaluating the linearity by observing the end side with a microscope and (B) a procedure for evaluating the linearity through contact with the end side by the hand of a human.

CITATION LIST

Patent Literature 1: JP 2015-63450 A

SUMMARY OF INVENTION

Technical Problem

However, when the linearity of the end side is evaluated by the above-mentioned procedures, there are the following problems to be solved.

Specifically, in the procedure (A), it is required that the entire region of segments to be evaluated for linearity in the end side be observed with the microscope. Therefore, as the segments to be evaluated are longer, the operation for evaluation becomes more significantly cumbersome. Thus, in the procedure (A), there is a problem in that, although a part of the segments in the long end side can be evaluated for linearity, it is substantially impossible to evaluate the linearity of the full length of the end side. Meanwhile, in the procedure (B), the linearity cannot be quantitatively evaluated, and hence there is a problem in that the accuracy of evaluation becomes lower as a consequence.

Those problems may similarly occur in the case in which the band-shaped glass film is cut along the longitudinal direction, and the linearity of the end side formed in association with the cutting is evaluated by the procedures (A) and (B) to inspect the quality of the cut band-shaped glass film, as well as in the above-mentioned case using the roll-to-roll mode.

The present invention has been made in view of the above-mentioned circumstances, and a technical object of the present invention is to establish a method in which, in cutting of the band-shaped glass film along the longitudinal direction and evaluating the linearity of the end side formed in association with the cutting to inspect the quality of the cut band-shaped glass film, the full length of the end side can be evaluated, and high-accuracy evaluation is obtained.

Solution to Problem

According to one embodiment of the present invention, which is devised to achieve the above-mentioned object, there is provided a quality inspection method for a band-shaped glass film, comprising cutting a band-shaped glass film along a longitudinal direction thereof and evaluating linearity of an end side formed in association with the cutting to inspect quality of a cut band-shaped glass film, the method comprising: an imaging step of dividing the end side into a plurality of segments and imaging each of the plurality of segments; a linear approximation step of calculating an approximate straight line of the end side based on a plurality of points different from each other on the end side in each of a plurality of images obtained in the imaging step; a variation calculation step of calculating a variation value of the plurality of points based on the approximate straight line in each of the plurality of images; and an evaluation step of evaluating the linearity of the end side based on a plurality of variation values respectively corresponding to the plurality of images.

In this method, through the imaging step, the end side is divided into the plurality of segments, and each of the segments is imaged. After that, through the linear approximation step and the variation calculation step, in each of the plurality of images obtained in the imaging step, the linearity of the end side in the segment projected on the image is quantitatively calculated as the variation value. Then, through the evaluation step, the linearity of the end side is evaluated based on the plurality of variation values respectively corresponding to the plurality of images. Specifically, in the evaluation step, the linearity is evaluated with respect to the full length of the end side based on the linearity of the end side in each of the segments calculated quantitatively. In the above-mentioned manner, according to this method, the linearity can be evaluated with respect to the full length of the end side. Further, the linearity in each of the segments serving as an origin for evaluation of the full length is quantitatively calculated, and hence high-accuracy evaluation can be obtained as evaluation on the full length.

In the above-mentioned method, it is preferred that the imaging step comprise imaging the cut band-shaped glass film while conveying the cut band-shaped glass film in the longitudinal direction under a state in which an imaging part configured to perform imaging is fixed to a fixed point.

With this, it is not required to move the imaging part along the longitudinal direction of the cut band-shaped glass film or change the direction in which the imaging part is directed in order to image each of the segments of the long end side. Therefore, the linearity of the end side can be efficiently evaluated.

In the above-mentioned method, it is preferred that the imaging step comprise imaging the cut band-shaped glass film from a direction in plan view.

When each of the segments of the end side is imaged from a direction different from a direction in plan view of the cut band-shaped glass film, in the case in which creases and waviness occur in the cut band-shaped glass film, there is a risk in that the following defect may occur. Specifically, when creases and waviness occur in the cut band-shaped glass film, the end side may be inevitably curved accordingly in some cases. In this case, it becomes difficult to accurately calculate the approximate straight line of the end side in the linear approximation step. Even when the linearity of the end side is actually sufficiently high, there is a risk in that the linearity of the end side may be evaluated to be low due to the influence of curving of the end side in association with the occurrence of the creases and waviness. However, when each of the segments of the end side is imaged from the direction in plan view of the cut band-shaped glass film, the above-mentioned risk can be appropriately eliminated. The reason for this is that, even when the end side is curved, each of the images obtained by imaging is less liable to be influenced by the curving through imaging from the direction in plan view.

In the above-mentioned method, it is preferred that the imaging step comprise imaging each of the plurality of segments to be imaged under a state in which each of the plurality of segments to be imaged is irradiated with light. Regarding the mode of irradiation of light, any of transmitted illumination (case in which a camera and a light source are opposed to each other with a band-shaped glass film interposed therebetween) and epi-illumination (case in which a camera and a light source are provided on the same surface side of a band-shaped glass film, and light reflected by the band-shaped glass film is captured by the camera) may be adopted.

With this, in each of the plurality of images obtained in the imaging step, each of the segments of the end side can be clearly projected only by the amount irradiated with light. Therefore, the foregoing is advantageous for obtaining high-accuracy evaluation.

In the above-mentioned method, it is preferred that the imaging step comprise partially superimposing one of the segments to be imaged adjacently on another of the segments.

With this, the number of images to be imaged in the imaging step inevitably increases as compared to the case in which one segment and another segment are not superimposed on one another between the segments to be imaged adjacently. Then, the linearity of the end side is evaluated based on variation values similarly increased in number by the increased number of the images, and hence the foregoing is further advantageous for obtaining high-accuracy evaluation. Further, when one segment and another segment are partially superimposed on one another, the occurrence of the segments failed to be imaged in the end side can be reliably prevented.

In the above-mentioned method, it is preferred that edge detection processing be performed before the linear approximation step in each of the plurality of images obtained in the imaging step.

With this, the contour of the end side becomes clear in each of the images obtained by imaging, and hence the foregoing is advantageous for obtaining high-accuracy evaluation.

In the above-mentioned method, it is preferred that the linear approximation step comprise positioning the plurality of points at equal intervals along the longitudinal direction of the cut band-shaped glass film.

When the plurality of points are unevenly located on the image obtained in the imaging step, there is a risk in that the approximate straight line calculated in the linear approximation step may not be sufficiently approximate to the end side. However, when the plurality of points are positioned at equal intervals along the longitudinal direction of the cut band-shaped glass film, the above-mentioned risk can be appropriately eliminated.

In the above-mentioned method, it is preferred that, after the band-shaped glass film is unwound from a first glass roll and cut along the longitudinal direction, the cut band-shaped glass film be wound up as a second glass roll.

With this, through use of the roll-to-roll mode, the band-shaped glass film is cut along the longitudinal direction, and the linearity of the end side formed in association with the cutting can be evaluated. Thus, the linearity of the end side can be significantly efficiently evaluated.

Through use of the quality inspection method, a glass roll formed of a band-shaped glass film having an end side with high linearity can be selected to be obtained by this method. The selected glass roll is a glass roll comprising a band-shaped glass film wound up in a roll shape. The glass roll satisfies the following condition (5) when the following operations (1) to (4) are performed.

Specifically, (1) when an end side of the band-shaped glass film extending in a longitudinal direction thereof is divided into a plurality of segments each having a length of 30 mm, and each of the plurality of segments is imaged, one of the segments to be imaged adjacently is superimposed on another of the segments by 5 mm and imaged in the superimposed state, and the band-shaped glass film is imaged from a direction in plan view. (2) In each of a plurality of images obtained by imaging, an approximate straight line of the end side is calculated by a least-square method based on eighty points different from each other on the end side positioned at equal intervals along the longitudinal direction. (3) In each of the plurality of images, a variation value of the eighty points is calculated as a standard deviation σ based on the approximate straight line. (4) In each of the plurality of images, a value of $Z=\sigma \times p$ is determined, where p[μm] represents a size of one pixel in each of the plurality of images. (5) $Z<105$ is satisfied in all the plurality of images, and $0 \leq Z \leq 50$ is satisfied in 99.5% or more of the plurality of images.

Advantageous Effects of Invention

According to the present invention, in cutting of the band-shaped glass film along the longitudinal direction and evaluating the linearity of the end side formed in association with the cutting to inspect the quality of the cut band-shaped glass film, the full length of the end side can be evaluated, and high-accuracy evaluation can be obtained.

DESCRIPTION OF EMBODIMENTS

Now, a quality inspection method for a band-shaped glass film and a glass roll according to an embodiment of the present invention are described with reference to the accompanying drawings.

Figure 1:
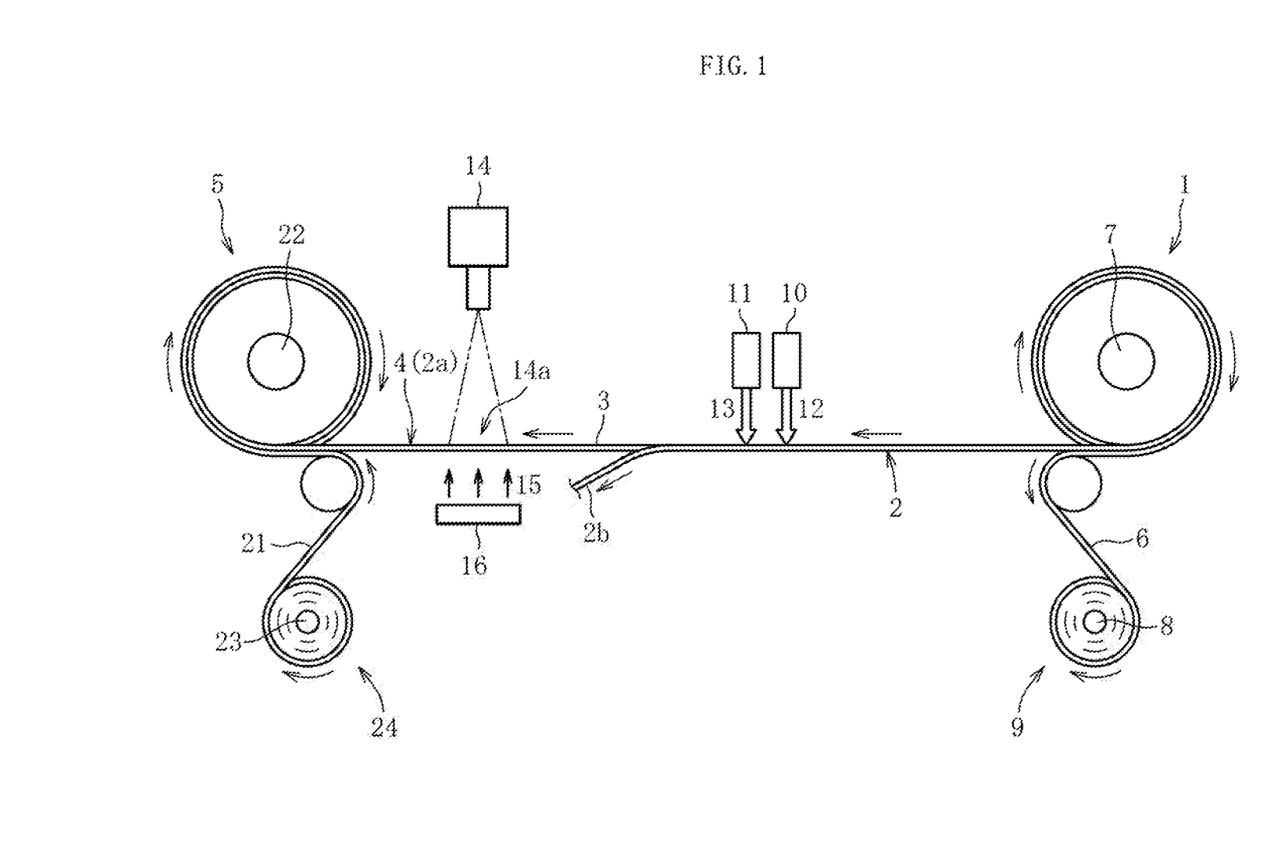
FIG. 1 is a side view for schematically illustrating a quality inspection method for a band-shaped glass film according to an embodiment of the present invention.

FIG. 1 is a side view for schematically illustrating of a quality inspection method for a band-shaped glass film according to this embodiment. As illustrated in FIG. 1, in this embodiment, through use of a roll-to-roll mode, a band-shaped glass film 2 unwound from a first glass roll 1 is cut along a longitudinal direction thereof while being conveyed in a horizontal posture, and the linearity of an end side 3 formed in association with the cutting is evaluated, to thereby inspect the quality of a cut band-shaped glass film 4. Further, the cut band-shaped glass film 4 is wound up in a roll shape again to provide a second glass roll 5.

The band-shaped glass film 2 to be cut is a band-shaped thin glass sheet formed by a down-draw method typified by, for example, an overflow down-draw method, a slot down-draw method, or a redraw method, or by a float method. The band-shaped glass film 2 has a thickness (for example, a thickness of 300 μm or less) to such a degree as to impart flexibility. Further, the band-shaped glass film 2 comprises an effective portion 2a and a pair of non-effective portions 2b and 2b. The effective portion 2a is present at a center in a width direction of the band-shaped glass film 2, and the pair of non-effective portions 2b and 2b are present on outer sides in the width direction with respect to the effective portion 2a.

The effective portion 2a is a part that is subjected to predetermined processing later to become a product glass film. In contrast, both the non-effective portions 2b and 2b are parts to be discarded later without becoming a product glass film. The effective portion 2a and both the non-effective portions 2b and 2b are separated from each other in association with the cutting of the band-shaped glass film 2. With this, the cut band-shaped glass film 4 is formed of only the effective portion 2a separated from both the non-effective portions 2b and 2b. Both ends in the width direction of the effective portion 2a serve as end sides 3 to be evaluated for linearity.

The first glass roll 1 is obtained by winding up the band-shaped glass film 2 and a band-shaped protective sheet 6 configured to protect the band-shaped glass film 2 in a roll shape around a roll core 7 under a state in which the band-shaped glass film 2 and the band-shaped protective sheet 6 are superimposed on one another. The band-shaped protective sheet 6 has a thickness to such a degree as to impart flexibility in the same manner as in the band-shaped glass film 2. The band-shaped protective sheet 6 is unwound together with the band-shaped glass film 2 unwound from the first glass roll 1 for cutting and then is separated from the band-shaped glass film 2. The separated band-shaped protective sheet 6 is wound up in a roll shape around a roll core 8 to provide a first sheet roll 9.

The band-shaped glass film 2 unwound from the first glass roll 1 is cut by a laser cleaving method. In order to perform the laser cleaningmethod, a laser irradiator 10 and a refrigerant jetting device 11 are used. The laser irradiator 10 and the refrigerant jetting device 11 are installed under a state of being fixed to fixed points above a conveyance path for the band-shaped glass film 2. Two laser irradiators 10 and two refrigerant jetting devices 11 are installed (in FIG. 1, only one laser irradiator 10 and only one refrigerant jetting device 11 are illustrated). One of the two laser irradiators 10 and one of the two refrigerant jetting devices 11 are each a device configured to separate the effective portion 2a and one of both the non-effective portions 2b and 2b from each other. Another of the two laser irradiators 10 and another of the two refrigerant jetting devices 11 are each a device configured to separate the effective portion 2a and another of both the non-effective portions 2b and 2b from each other.

The laser irradiator 10 is configured to continuously irradiate the band-shaped glass film 2 passing below the laser irradiator 10 with a laser beam 12 along a boundary between the effective portion 2a and the non-effective portion 2b. The refrigerant jetting device 11 is configured to continuously jet refrigerant 13 (for example, mist-like water) to a part of the band-shaped glass film 2 irradiated with the laser beam 12. With this, through use of a thermal stress caused by a temperature difference between the part heated with the laser beam 12 and the part cooled with the refrigerant 13, the band-shaped glass film 2 is continuously cut (cleaved) along the boundary between the effective portion 2a and the non-effective portion 2b to separate the effective portion 2a and the non-effective portion 2b from each other. The non-effective portion 2b separated from the effective portion 2a is removed downwardly from the conveyance path for the cut band-shaped glass film 4 (band-shaped glass film 4 formed of only the effective portion 2a) and then is cut to an appropriate length to be discarded.

In this case, as a modification example of this embodiment, for example, the band-shaped glass film 2 may be cut through use of the following cutting procedure. Specifically, a cutting procedure may be used, which involves fusing the band-shaped glass film 2 by irradiation of the laser beam along the boundary between the effective portion 2a and the non-effective portion 2b, and peeling and removing the fused end portion formed in the fused effective portion 2a as thread-like glass from the effective portion 2a. In this case, both ends in the width direction of the effective portion 2a having the fused end portions peeled therefrom serve as the end sides 3 to be evaluated for linearity.

When the linearity of the end side 3 is evaluated, first, an imaging step of dividing the end side 3 into a plurality of segments and imaging each of the segments is performed. In the imaging step, a camera 14 serving as an imaging part and a light source 16 (for example, a plate-like LED illuminator) capable of emitting light 15 are used. In FIG. 1, there is illustrated an illumination system in which the camera 14 and the light source 16 are opposed to each other with the band-shaped glass film 4 interposed therebetween. However, there may be used an illumination system in which the camera 14 and the light source 16 are provided on the same surface side with respect to the band-shaped glass film 4, and reflected light from the band-shaped glass film 4 is utilized. Two cameras 14 and two light sources 16 are installed (in FIG. 1, only one camera 14 and only one light source 16 are illustrated). One of the two cameras 14 and one of the two light sources 16 are each a device configured to perform the imaging step with respect to the end side 3 positioned on one side in the width direction of the effective portion 2a, and another of the two cameras 14 and another of the two light sources 16 are each a device configured to perform the imaging step with respect to the end side 3 positioned on another side in the width direction of the effective portion 2a.

The camera 14 is capable of performing imaging of each of the segments of the end side 3 from a direction in plan view of the band-shaped glass film 4. The camera 14 is installed under a state of being fixed to a fixed point above the conveyance path for the band-shaped glass film 4, and the end side 3 passes across a field of view 14a of the camera 14 in association with the conveyance of the band-shaped glass film 4. In this case, in this embodiment, the band-shaped glass film 4 is conveyed at a certain conveyance speed. The camera 14 is controlled so as to perform imaging continuously at certain time intervals. The camera 14 is configured to perform imaging every time the band-shaped glass film 4 is conveyed to a downstream side by a certain distance along the conveyance direction based on a relationship between the conveyance speed of the band-shaped glass film 4 and the time interval at which the camera 14 performs imaging. The certain distance (hereinafter referred to as "conveyance distance between imaging operations") by which the band-shaped glass film 4 is conveyed between imaging operations is regulated to be shorter than a length (hereinafter referred to as "field-of-view length") along the conveyance direction of the field of view 14a of the camera 14.

The light source 16 is installed under a state of being fixed to a fixed point below the conveyance path for the band-shaped glass film 4 so as to be opposed to the camera 14 with the band-shaped glass film 4 interposed therebetween in a thickness direction of the band-shaped glass film 4 (vertical direction). The light source 16 can emit the light 15 toward the segments falling within the field of view 14a of the camera 14 in the end side 3. With this, imaging can be performed under a state in which each of the segments of the end side 3 to be imaged is irradiated with the light 15.

Figure 2A:
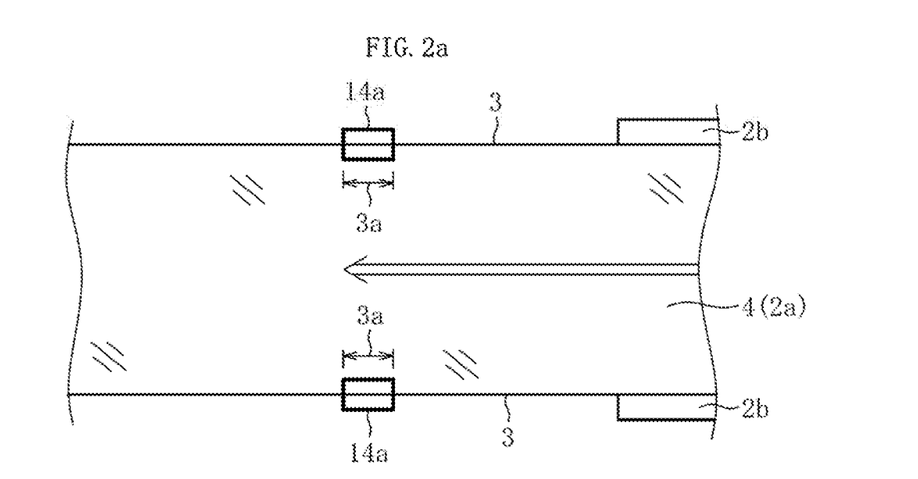
FIG. 2a is a plan view for illustrating an imaging step in the quality inspection method for a band-shaped glass film according to the embodiment of the present invention.
Figure 2B:
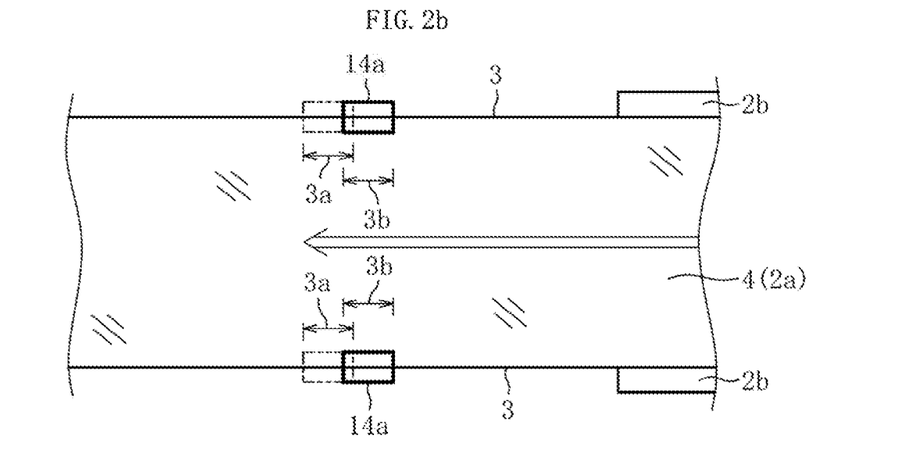
FIG. 2b is a plan view for illustrating the imaging step in the quality inspection method for a band-shaped glass film roll 1 according to the embodiment of the present invention.
Figure 2C:
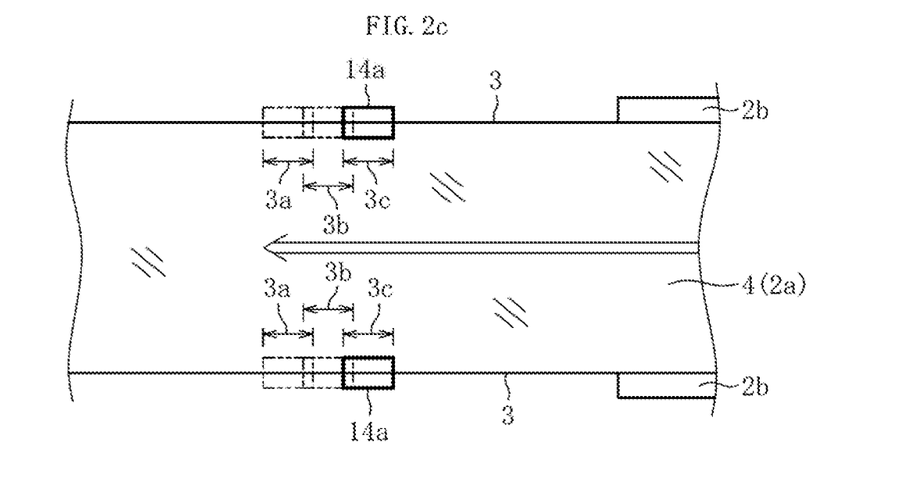
FIG. 2c is a plan view for illustrating the imaging step in the quality inspection method for a band-shaped glass film according to the embodiment of the present invention.

FIG. 2a to FIG. 2c are each a plan view for illustrating the imaging step in this embodiment. A specific mode of the imaging step is described below with reference to FIG. 2a to FIG. 2c. Here, in FIG. 2a to FIG. 2c, each range surrounded by a square represented by the thick solid line corresponds to the field of view 14a of the camera 14. The field of view 14a is constantly present at the same position on the conveyance path for the band-shaped glass film 4.

As illustrated in FIG. 2a, when the camera 14 performs imaging, a segment 3a falling within the field of view 14a in the end side 3 is imaged. After that, as illustrated in FIG. 2b, when the camera 14 performs imaging again after a time interval, a segment 3b falling within the field of view 14a is imaged at a point in time when the band-shaped glass film 4 is conveyed to a downstream side by the conveyance distance between imaging operations based on the imaging time of the segment 3a. In this case, the conveyance distance between imaging operations is shorter than the field-of-view length, and hence both the segments 3a and 3b are partially superimposed on one another. Specifically, imaging is performed again before the segment 3a finishes passing through the field of view 14a, and the segment 3b is imaged. Further, after that, as illustrated in FIG. 2c, when the camera 14 performs imaging again after a time interval, a segment 3c falling within the field of view 14a is imaged at a point in time when the band-shaped glass film 4 is conveyed to a downstream side by the conveyance distance between imaging operations based on the imaging time of the segment 3b. In the same manner as in the case in which the segments 3a and 3b are partially superimposed on one another, the segments 3b and 3c are also partially superimposed on one another. When imaging is performed continuously at time intervals with the camera 14, the full length of the end side 3 is imaged under a state of being divided into the plurality of segments. With this, each of the segments of the end side 3 is projected on each image obtained by imaging. Thus, the imaging step is completed.

Figure 3:
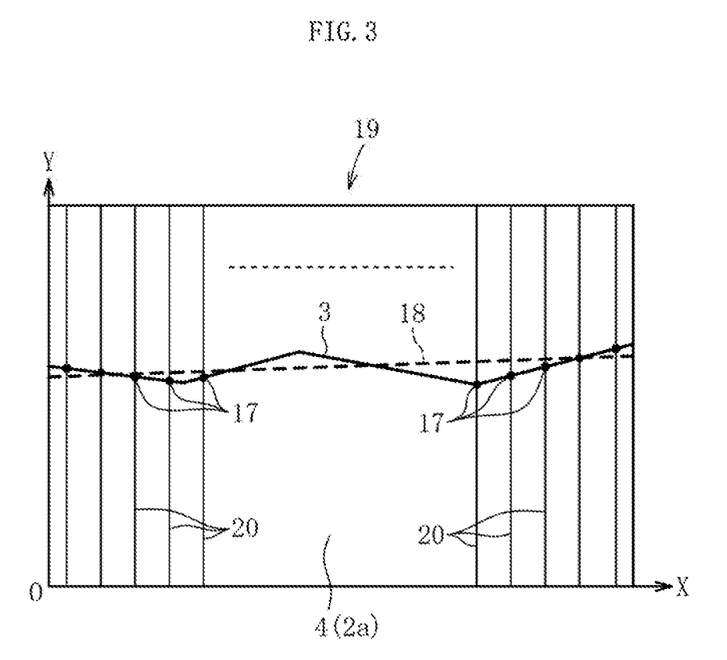
FIG. 3 is a view for illustrating a linear approximation step and a variation calculation step in the quality inspection method for a band-shaped glass film according to the embodiment of the present invention.

When the imaging step is completed, next, each of the plurality of images obtained in the imaging step is subjected to edge detection processing. With this, the contour of the end side 3 is made clear on each of the images. When the edge detection processing is completed, a linear approximation step and a variation calculation step are performed. FIG. 3 is a view for illustrating the linear approximation step and the variation calculation step in this embodiment. Now, both the steps are described with reference to FIG. 3.

In the linear approximation step, an approximate straight line 18 of the end side 3 is calculated based on a plurality of points 17 different from each other on the end side 3 in each of the images obtained in the imaging step. In calculation of the approximate straight line 18, first, a plurality of straight lines 20 extending along the width direction of the band-shaped glass film 4 are drawn at equal intervals on an image 19 (in FIG. 3, the straight lines 20 are partially omitted). Then, the points 17 are plotted on all the intersections between the plurality of straight lines 20 and the end side 3. Each of coordinates of the plurality of plotted points 17 on the image 19 is determined by an X-coordinate axis and a Y-coordinate axis orthogonal to each other. The X-coordinate axis extends in the longitudinal direction (conveyance direction) of the band-shaped glass film 4, and the Y-coordinate axis extends in the width direction of the band-shaped glass film 4. The plurality of points 17 are positioned at equal intervals along the longitudinal direction of the band-shaped glass film 4. In this case, in order to accurately calculate the approximate straight line 18, it is preferred that an interval between the adjacent straight lines 20 be shorter than a length of 0.4 mm (which is not a length on the image 19, but an actual length) along the longitudinal direction of the band-shaped glass film 4. Finally, the approximate straight line 18 is calculated by a least-square method based on each of the coordinates of the plurality of points 17. Thus, the linear approximation step is completed.

In the variation calculation step, variation values of the plurality of points 17 from the approximate straight line 18 are calculated based on the approximate straight line 18 in each of the images obtained in the imaging step. In this embodiment, a value of a standard deviation G (value based on a pixel) is calculated as a variation value. In this case, as a modification example of this embodiment, for example, a variance value may be calculated as the variation value. Thus, the variation calculation step is completed. When the variation calculation step is completed, the value of the standard deviation σ corresponding to each of the plurality of images obtained in the imaging step is calculated. Specifically, the number of the images obtained by imaging in the imaging step becomes equal to the number of values of the standard deviations σ calculated in the variation calculation step. Each of the calculated values of the plurality of standard deviations σ is a value that quantitatively indicates the linearity of the end side 3 in the segment projected on the image 19. A value of 6σ obtained by multiplying the value of the standard deviation σ by 6 is a value that is substantially equal to a mutual distance (mutual distance along the width direction) between a portion that protrudes most to an outer side in the width direction and a portion that is recessed most to an inner side in the width direction in the segment projected on each of the images of the end side 3.

When the linear approximation step and the variation calculation step are completed, an evaluation step is performed. In the evaluation step, the linearity of the end side 3 is evaluated based on the value of the standard deviation σ corresponding to each of the plurality of images. Now, the evaluation step is described by way of a specific example.

For example, it is assumed that, in each of the images obtained by imaging in the imaging step, a range of 30 mm is imaged along the longitudinal direction (direction in which the X-coordinate axis extends on the image 19) of the band-shaped glass film 4, and a range of 22.5 mm is imaged along the width direction (direction in which the Y-coordinate axis extends on the image 19) of the band-shaped glass film 4. Both the lengths are not the lengths on the image 19, but actual lengths. In this example, the field-of-view length is set to 30 mm, and the conveyance distance between imaging operations is set to 25 mm. Specifically, in this example, one segment and another segment are superimposed on one another by a length of 5 mm between the segments to be imaged adjacently. Further, in this example, there are arranged 1,600 pixels along the longitudinal direction and 1,200 pixels along the width direction, with one pixel having a size of 18.75 μm. When the standard deviation G is determined, the image 19 is divided into eighty portions in the longitudinal direction, and the plurality of straight lines 20 are drawn so as to be shifted by ½ pitch from each other. Then, intersections between the plurality of straight lines 20 and the end side 3 are defined as the plurality of points 17, and thus, the approximate straight line 18 is created.

A value of Z is calculated by an expression Z=(Standard Deviation σ×18.75)/5 based on the standard deviation G corresponding to each of the plurality of images under the above-mentioned condition. The value of Z is calculated as an integer value and is dealt with by a programmable logic controller (PLC). For example, the value of Z of from 0 to 3 is classified as "A rank", the value of Z of from 4 to 10 is classified as "B rank", the value of Z of from 11 to 20 is classified as "C rank", and the value of Z of 21 or more is classified as "D rank". After that, all the values of Z (each value of Z corresponding to the value of each standard deviation σ) obtained by the above-mentioned expression are classified as "A rank" to "D rank". As a result, for example, when the "B rank" or more occupies 99.5% or more, the "C rank" occupies less than 0.5%, and the "D rank" occupies 0%, the linearity of the end side 3 is evaluated as success. Specifically, as a result of inspecting the quality of the band-shaped glass film 4, the band-shaped glass film 4 is determined to have quality suitable for a product. Thus, the evaluation step is completed.

In this case, in this embodiment, the evaluation step is performed in the above-mentioned mode, but the present invention is not limited thereto. The evaluation step can be performed in any mode as long as the evaluation is made based on a variation value that is quantitatively obtained in the variation calculation step. For example, when there is no constraint that the value of Z is dealt with by the PLC, Z may be calculated by an expression Z=Standard Deviation σ×18.75.

As illustrated in FIG. 1, the cut band-shaped glass film 4 is superimposed on a band-shaped protective sheet 21 configured to protect the cut band-shaped glass film 4, and in this superimposed state, both the cut band-shaped glass film 4 and the band-shaped protective sheet 21 are wound up in a roll shape around a roll core 22 to provide the second glass roll 5. The band-shaped protective sheet 21 has a thickness to such a degree as to impart flexibility in the same manner as in the band-shaped glass film 4. The band-shaped protective sheet 21 is unwound to be supplied from a second sheet roll 24 in which the band-shaped protective sheet 21 is wound up in a roll shape around a roll core 23. Thus, the quality inspection method for a band-shaped glass film according to this embodiment is completed.

Now, the main action and effect of the quality inspection method for a band-shaped glass film according to this embodiment of the present invention are described.

In the quality inspection method for a band-shaped glass film according to this embodiment, through the imaging step, the end side 3 is divided into the plurality of segments, and each of the segments is imaged. After that, through the linear approximation step and the variation calculation step, in each of the plurality of images 19 obtained in the imaging step, the linearity of the end side 3 in the segment projected on the image 19 is quantitatively calculated as the value of the standard deviation σ. Then, through the evaluation step, the linearity of the end side 3 is evaluated based on the plurality of values of standard deviations σ respectively corresponding to the plurality of images 19. Specifically, in the evaluation step, the linearity is evaluated with respect to the full length of the end side 3 based on the linearity of the end side 3 in each of the segments calculated quantitatively. In the above-mentioned manner, the linearity can be evaluated with respect to the full length of the end side 3. Further, the linearity in each of the segments serving as an origin for evaluation of the full length is quantitatively calculated, and hence high-accuracy evaluation can be obtained as evaluation on the full length.

Now, a method of manufacturing a glass roll through use of the above-mentioned quality inspection method for a band-shaped glass film is described. In the description of the manufacturing method, the components that are substantially the same as those of the components described in the above-mentioned quality inspection method are denoted by the same reference symbols as those therein, and overlapping description is omitted.

Through use of the quality inspection method, the glass roll 5 formed of the band-shaped glass film 4 having the end side 3 with high linearity can be selected. Specifically, in the case of manufacturing a plurality of glass rolls 5 each obtained by winding up the band-shaped glass film 4 after being cut along the longitudinal direction in a roll shape, only a good product having the end side 3 with high linearity can be collected from a plurality of products.

The collected glass roll 5 satisfies the following condition (5) when the following operations (1) to (4) are performed.

(1) The end side 3 of the band-shaped glass film 4 is divided into a plurality of segments each having a length of 30 mm (length along the longitudinal direction of the band-shaped glass film 4), and each of the segments is imaged. In this case, one of the segments to be imaged adjacently is superimposed on another of the segments by 5 mm and imaged in this superimposed state, and the band-shaped glass film 4 is imaged from a direction in plan view. The number of a plurality of segments increases or decreases depending on the length of the band-shaped glass film 4 (length of the end side 3).

(2) In each of the plurality of images 19 obtained by imaging (the number of the images 19 is equal to the number of the plurality of segments), the approximate straight line

18 of the end side 3 is calculated by the least-square method based on the eighty points 17 different from each other on the end side 3 positioned at equal intervals along the longitudinal direction of the band-shaped glass film 4.

(3) In each of the plurality of images 19, a variation value of the eighty points is calculated as the standard deviation σ based on the approximate straight line 18.

(4) In each of the plurality of images 19, a value of Z=σ×p is determined, where p[μm] represents the size of one pixel in the image 19. As one example, p is 18.75, but the value may be varied depending on the condition of imaging.

(5) Z<105 is satisfied in all the plurality of images 19, and 0≤Z≤50 is satisfied in 99.5% or more of the plurality of images 19. When the number of the plurality of images is represented by N, and the number calculated by N×0.995 is not an integer, the fractional portion of the number is dropped.

In this case, the quality inspection method for a band-shaped glass film according to the present invention is not limited to the mode described in the above-mentioned embodiment. For example, in the above-mentioned embodiment, through use of the roll-to-roll mode, the band-shaped glass film is cut along the longitudinal direction, and the linearity of the end side formed in association with the cutting is evaluated. However, the present invention is not limited thereto. The present invention can be applied also to the case in which, in a band-shaped glass film formed by a down-draw method or a float method, non-effective portions present at both ends in a width direction of the band-shaped glass film (parts including edge portions) are cut, and the linearity of an end side formed in association with the cutting is evaluated.

REFERENCE SIGNS LIST

1 first glass roll
2 band-shaped glass film
3 end side
3a to 3c segment
4 cut band-shaped glass film
5 second glass roll
14 camera
15 light
17 point
18 approximate straight line
19 image

The invention claimed is:

1. A quality inspection method for a band-shaped glass film, the quality inspection method comprising:
a conveying step of conveying the band-shaped glass film;
a cutting step of cutting the band-shaped glass film along a longitudinal direction thereof to form an effective portion of the band-shaped glass film and a non-effective portion of the band-shaped glass film during the conveying,
an imaging step of dividing an end side of the effective portion of the band-shaped glass film into a plurality of segments as seen from an upper side to a lower side of the band-shaped glass film and imaging each of the plurality of segments with a camera at a time interval during the conveying to generate a plurality of images;

a linear approximation step of calculating with a programmable logic controller an approximate straight line of the end side of the effective portion of the band-shaped glass film formed by the cutting based on a plurality of points different from each other on the end side in each of the plurality of images obtained in the imaging step;

a variation calculation step of calculating with the programmable logic controller a variation value of the plurality of points based on the approximate straight line in each of the plurality of images; and an evaluation step of evaluating with the programmable logic controller a linearity of the end side as seen from the upper side to the lower side of the band-shaped glass film based on the plurality of variation values respectively corresponding to the plurality of images.

2. The quality inspection method for a band-shaped glass film according to claim 1, wherein the imaging step comprises imaging each of the plurality of segments during the conveying under a state in which the camera is fixed to a fixed point.

3. The quality inspection method for a band-shaped glass film according to claim 1, wherein the imaging step comprises imaging each of the plurality of segments from a direction in plan view.

4. The quality inspection method for a band-shaped glass film according to claim 1, wherein the imaging step comprises imaging each of the plurality of segments to be imaged under a state in which each of the plurality of segments to be imaged is irradiated with light.

5. The quality inspection method for a band-shaped glass film according to claim 1, wherein the imaging step comprises partially superimposing one of the segments to be imaged adjacently on another of the segments.

6. The quality inspection method for a band-shaped glass film according to claim 1, wherein edge detection processing is performed before the linear approximation step in each of the plurality of images obtained in the imaging step.

7. The quality inspection method for a band-shaped glass film according to claim 1, wherein the linear approximation step comprises positioning the plurality of points at equal intervals along the longitudinal direction of the cut band-shaped glass film.

8. The quality inspection method for a band-shaped glass film according to claim 1, wherein, after the band-shaped glass film is unwound from a first glass roll and cut along the longitudinal direction, the cut band-shaped glass film is wound up as a second glass roll.

* * * * *